United States Patent
Bijani et al.

(10) Patent No.: US 8,776,007 B2
(45) Date of Patent: Jul. 8, 2014

(54) ASSESSMENT OF SOFTWARE CODE DEVELOPMENT

(75) Inventors: Pramod Bijani, Mumbai (IN); Colin P. Jarrett, Surrey (GB); Vikrant Shyamkant Kaulgud, Maharastra (IN); Nishant Kumar, Bangalore (IN); Vallinath Sriramula, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 512 days.

(21) Appl. No.: 13/101,315

(22) Filed: May 5, 2011

(65) Prior Publication Data

US 2011/0276354 A1    Nov. 10, 2011

(51) Int. Cl.
*G06F 9/44* (2006.01)
(52) U.S. Cl.
CPC .................................. *G06F 8/20* (2013.01)
USPC ................................... 717/100; 717/106
(58) Field of Classification Search
CPC .......................................................... G06F 8/20
USPC ..................................... 717/110, 106
See application file for complete search history.

(56) References Cited

U.S. PATENT DOCUMENTS

| | | | |
|---|---|---|---|
| 6,199,193 B1 * | 3/2001 | Oyagi et al. | 717/101 |
| 8,418,123 B2 * | 4/2013 | Kamiyama et al. | 717/101 |
| 2009/0138860 A1 * | 5/2009 | Fusegawa et al. | 717/131 |
| 2010/0162200 A1 * | 6/2010 | Kamiyama et al. | 717/101 |

FOREIGN PATENT DOCUMENTS

EP    1939729 A1 *  7/2008  ............ G06F 9/44

* cited by examiner

*Primary Examiner* — Phillip H Nguyen
(74) *Attorney, Agent, or Firm* — Mannava & Kang, P.C.

(57) ABSTRACT

A cost per unit of processed code metric is determined based on a quantity of processed code during a given time period that is attributable to one or more developers, and a cost to develop the quantity of processed code during the time period attributable to the one or more developers. Also, a quality scaling factor is calculated based on quality measurements for the quantity of processed code. Thereafter, the cost per unit of processed code metric is scaled (or discounted) by the quality scaling factor to provide a cost of development index (CDI). Because the inputs to the quality scaling factor may be determined in an automated fashion, this CDI determination permits more rapid response to any adverse assessments. Furthermore, because direct measurement of code quality is employed, more meaningful insight is provided into the likelihood that end product, i.e., the software code, is of good quality.

24 Claims, 4 Drawing Sheets

- PRIOR ART -

ASSESSMENT OF SOFTWARE CODE DEVELOPMENT

FIELD OF THE INVENTION

The instant disclosure relates generally to software development and, in particular, to the assessment of software development efforts to determine effectiveness thereof.

BACKGROUND OF THE INVENTION

As known in the art, software code comprises instructions that may be used to control or instruct the operation of one or more processing devices, such as microprocessors, microcontrollers, co-processors, etc. Indeed, software code is ubiquitous and pervades many aspects of modern day technology. It is not uncommon for software development projects to require the services of numerous software code developers and their supervisors for periods of time stretching over many months or even years. Moreover, the software delivery teams for such efforts are often distributed across multiple geographies. Because of this, substantial costs are often incurred for resource allocation, resource management, resource training and delivery management.

Of course, the end goals of virtually all software development projects include delivering software code of the highest possible quality at the lowest possible cost. Ideally, these two goals are not independent of each other: software code delivery at a low cost is meaningless if quality standards are not maintained, and high quality software code is of little value if the cost of its production is allowed to grow uncontrolled. Ideally, project managers seek to find the optimum balance between achieving highest quality while simultaneously minimizing costs.

Various currently-available techniques attempt to manage and optimize these goals. For example, the so-called Capability Maturity Model Integration (CMMI) and similar methods attempt to provide high level project efficiency based on measurements of the processes used to deliver the end product. That is, CMMI and related methods essentially use metrics about the delivery process itself, rather than the end product, as a proxy for quality of the end product. With these methods, the intuition is that commitment to a well-designed delivery process is more likely to result in efficient delivery of a high quality end product. However, such techniques typically only provide coarse-grained insight into the delivery efficiency and quality of the end product, mostly because of the relatively infrequent analysis intervals (sometimes, as infrequent as a monthly basis) and the inherent limitations of using process metrics as proxies for actual quality of the end product. Even where some insight into efficiency and quality is provided, the high level nature of these methods prevents or obscures more detailed insight into the performance of smaller groups or individuals. Indeed, even if excellent overall process adherence is achieved, it is readily conceivable that performance of individual developers or groups of developers could undermine quality and/or efficiency goals.

Thus, it would be advantageous to provide a system and techniques that overcome these limitations.

SUMMARY OF THE INVENTION

The instant disclosure describes a metric called the Cost of Development Index (CDI), which may be advantageously used to assess software development efforts with virtually any desired frequency during the software development process. In particular, the CDI provides a score based on a volume and cost of work that occurs during a given period of time and the quality of that work. To this end, automated data collection mechanisms may be employed to automatically collect data related to effort as measured by the amount of code developed and the quality of this effort in terms of, in one embodiment, code quality and test coverage. Cost of development efforts may be based on resource cost data available to the software development organization. Equally important, the CDI assessment can be performed on the basis of individual developers or groups of developers, up to and including teams, groups or even entire project staffs.

In an embodiment, a cost per unit of processed code metric is determined based on a quantity of processed code during a given time period that is attributable to one or more developers, and a cost to develop the quantity of processed code during the time period attributable to the one or more developers. Also, a quality scaling factor is calculated based on quality measurements for the quantity of processed code. Thereafter, the cost per unit of processed code metric is scaled (or discounted) by the quality scaling factor to provide a cost of development index. In an embodiment, the quantity of code is defined by that portion of software code that is altered (i.e., created, modified or deleted) by the one or more developers during the time period. Furthermore, the portion of the software code specifically considered may comprise non-commented, non-white space lines of code. In another embodiment, the cost to develop the quantity of code may be a loaded cost encompassing any combination of direct and/or indirect costs attributable to the one or more developers. Because each of the data inputs used to determine the CDI can be determined at the level of an individual developer, corresponding individual cost of development indices may be determined. Alternatively, by collecting such data across defined groups of developers, group cost of development indices may also be developed. In one aspect of the instant disclosure, the cost of development indices may be output in any convenient manner. The various techniques described herein may be implemented through the use of processing devices, such as one or more processors executing stored instructions (e.g., appropriately programmed computers) or equivalents thereof.

In another aspect described herein, the quality scaling factor is determined according to quality measurements determined for the quantity of processed code during the time period as well as a test coverage percentage for the quantity of processed code. Furthermore, trends in performance may be assessed by incorporating improvements in both quality and test coverage into the quality scaling factor. Because these inputs into the quality scaling factor may be determined in an automated fashion, the instant technique may be readily applied according to virtually any desired frequency thereby permitting more rapid response to any adverse assessments. Furthermore, because direct measurement of code quality is employed in the determination of the CDI, more meaningful insight is provided into the likelihood that end product, i.e., the software code, is of good quality. In this manner, the instant disclosure improves upon the relatively coarse and limited analysis provided by prior art techniques.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
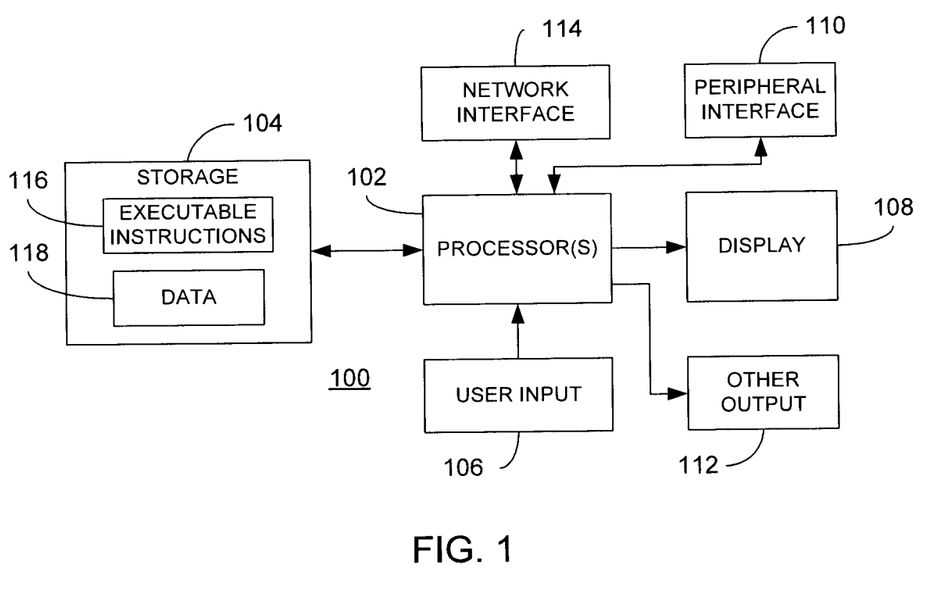
FIG. 1 is a block diagram of a processing device that may be used to implement various aspects of the instant disclosure.

Referring now to FIG. 1, a representative processing device 100 that may be used to implement the teachings of the instant disclosure is illustrated. The device 100 may be used to implement, for example, one or more of the components illustrated in FIGS. 2, 4 and 5, or to implement the process illustrated in FIG. 3. Regardless, the device 100 comprises at least one processor 102 coupled to a storage component 104. The storage component 104, in turn, comprises stored executable instructions 116 and data 118. In an embodiment, the processor 102 may comprise one or more processing devices such as a microprocessor, microcontroller, digital signal processor, or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. The user input device 106 may comprise any mechanism for providing user input (such as inputs specifying query topics, entity types, etc. as described below) to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the executable instruction implemented functionality may be implemented using firmware and/or hardware devices such as application specific integrated circuits (ASICs), programmable logic arrays, state machines, etc. Further still, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
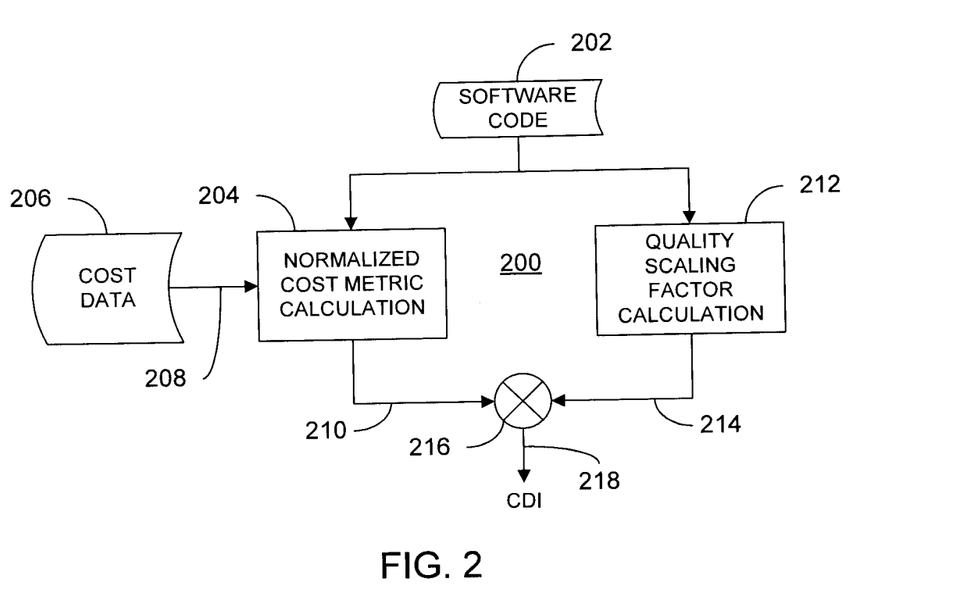
FIG. 2 is a block diagram illustrating an embodiment in accordance with the instant disclosure.

Referring now to FIG. 2, an embodiment in accordance with the instant teachings is illustrated. In particular, an apparatus 200 is provided that may be used to analyze software code 202 and cost data 206 to provide a cost of development index (CDI) 218. In particular, the apparatus comprises a normalized cost metric calculation component 204, a quality scaling factor calculation component 212 and a scaling component 216 as shown. Generally, the software code 202 is stored in one or more suitable repositories and comprises, in addition to source code (i.e., software code expressed in the human-readable format in which it is written by a developer), additional meta data about specific portions of the software code 202. For example, as described in further detail below with respect to FIG. 6 and in accordance with a "JAVA" programming language example, source code may be organized into packages and/or classes. In addition to such source code, information regarding the individual developer responsible for each package and/or class, time stamps concerning when alteration have been made to a source code file, specifics of alterations made to the source code file, etc. may be included. Such meta data may be captured using existing software development tools including, but not limited to, integrated development environment (IDE) tools, source code management tools, etc. Of course, those having ordinary skill in the art will appreciate that the techniques described herein are not necessarily limited to any particular type of programming language or programming methodology.

The normalized cost metric calculation component 204 operates upon the software code 202 to determine a cost per unit of processed code metric 210. As described in further detail below, the cost per unit of processed code metric 210 is calculated based on a quantity of processed code attributable to one or more developers during a given time period and a cost to develop the quantity of code during the time period and attributable to the one or more developers. Particularly, the quantity of processed code is determined, in one embodiment, to include that portion of the software code 202 (quantified in terms of a number of lines of code) altered by the one or more developers. Furthermore, software code 202 that has been altered may include code that had one or more non-commented (i.e., not solely a comment), non-white space lines of code (NCWLOC) created, modified or deleted during the period of time. However, it is understood that varying quantities of processed code may be defined according to different combinations of such criteria. For example, a given quantity of processed code may be identified by only including NCWLOC in which only new lines of code have been created during the time period. Alternatively, only NCWLOC in which specific types of modifications have been made may be included. Other combinations of identifying criteria may be readily devised by those having ordinary skill in the art without departing from the scope of the instant disclosure.

As noted above, the quantity of processed code is determined according to a given time period and is attributable to one or more developers. Because the alterations to specific portions of software code can be tracked down the level of specific days, hours or even minutes, it becomes possible to very specifically define a time period and quickly determine which portions of the software code 202 fall within such time period. For example, in an embodiment, the time period may be defined as two calendar weeks, thereby allowing multiple assessments of the software code 202 during a single month. However, it is understood that longer or shorter periods of time may be employed as a matter of design choice. In an embodiment, the time period may be fixed or may be set according to user input received, for example, via a suitable graphical user interface or the like. Additionally, the identification of specific developers may range anywhere from an individual developer to groups of developers of various sizes. Once again, the specification of individual or groups of developers may be fixed (as in the case of automatically generated reports for each developer) or user-configurable when desired. As described in further detail below, the quantity, cost and quality measurements may be obtained down to the level of individual developers and aggregated with similar measurements for other developers, again all over a given period of time. The aggregated information thus obtained may then be used to determine a cost of development index for the group of developers thus defined.

The cost data 206 may comprise data concerning and direct and indirect costs attributable to individual developers and/or groups of developers. For example, salary and other pay data (e.g., bonus amounts, overtime pay, etc.) for individual developers are examples of direct costs that may be included in the cost data 206. Similarly, cost of benefits data (e.g., insurance costs, for each developer may be maintained in the cost data 206. More indirect examples may include a portion of: the cost to rent and maintain a facility where a given developer works, the cost for administrative overhead in the organization in which the developer works, the cost of non-project-specific supplies to the organization, etc. Because such costs may vary geographically, the cost data 206 may include conversion rates such that the cost data 206 is expressed in according to a single basis, e.g., U.S. dollars. In an embodiment, the cost of an individual developer includes only those costs directly attributable to the developer, whereas a loaded cost additionally includes the indirect costs attributable to the developer. Once again, where analysis for groups of developers is desired, the cost (or loaded cost) of a group of developers may be identified by aggregating the individual costs of individual developers accordingly. As those having ordinary skill in the art will appreciate, the effectiveness of the techniques described herein is not tied to any particular cost measurement technique across one or more developers, but is instead derived from the fact that a common cost measurement technique is applicable across all developers in question, thereby providing a reliable baseline for comparisons.

The quality scaling factor calculation component 212 operates to calculate a quality scaling factor 214 based on quality measurements obtained through analysis of the software code 202. As described in greater detail below, the quality measurements used for this purpose may be obtained using automated techniques. Like the cost and quantity measurements noted above, the quality measurements are determined on the basis of that portion of the software code 202 giving rise to the quantity of processed code during the time period in question. In an embodiment, the quality scaling factor 214 is calculated in a fashion that it results in a value that is always greater than or equal to one, where decreasing overall quality of the underlying software code translates into larger values for the quality scaling factor 214. To the extent that the scaling component 216 is a multiplier, then, the quality scaling factor 214 is used to increase the CDI 218. This matches the intuition behind the CDI 218 that poor quality effectively raises the cost of developing the software code at an acceptable quality level.

Figure 3:
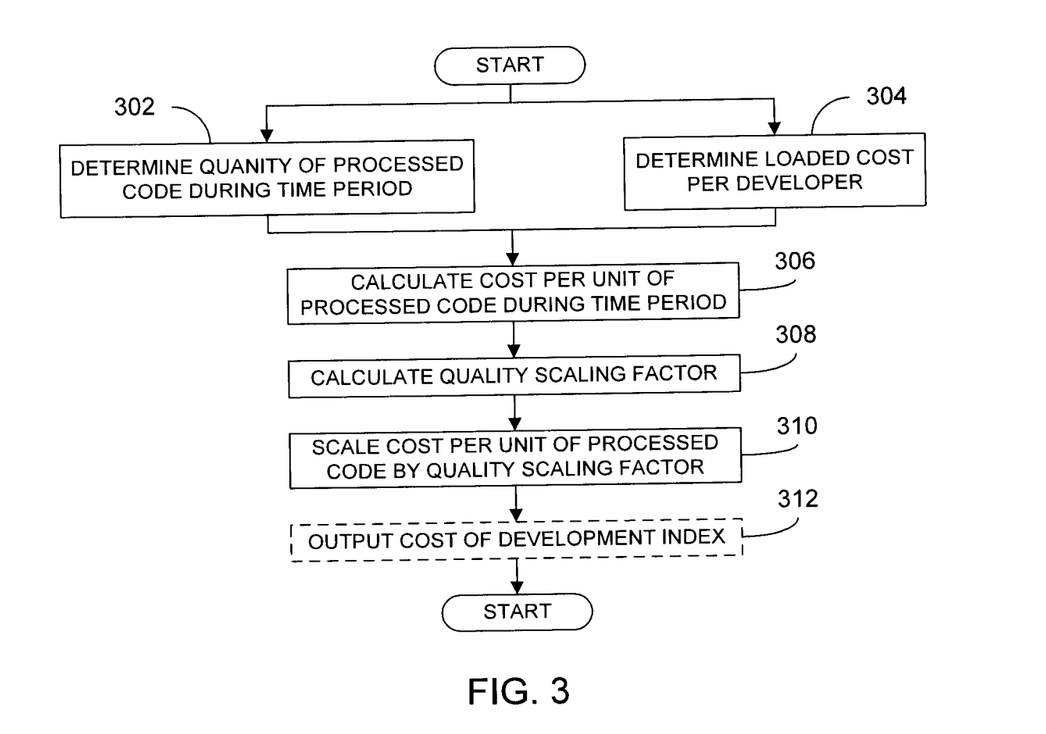
FIG. 3 is a flow chart illustrating processing in accordance with the instant disclosure.

Referring now to FIG. 3, processing in accordance with the techniques described herein is further illustrated and described. In particular, the processing illustrated in FIG. 3 concerns a single iteration of the determination of a cost of development index, i.e., for a given time period. However, it is understood that this process may be as repeated as often as desired and according to any desired time period. Furthermore, the description below of FIG. 3 is with reference to a single developer. However, as noted previously, this same process may be performed on the basis of aggregated data inputs corresponding to multiple developers.

Regardless, processing begins at blocks 302 and 304 (as illustrated by the dashed outlines). At block 302, the quantity of processed code is determined according to the identity of the specific developer and the time period in question. Thus, in an embodiment, any software code that has been altered by a specific developer during the time period is identified. Once again, the criteria concerning what software code will qualify for inclusion may be designated according to user input. Likewise, at block 304, the loaded cost per developer is determined. The cost to a company or other organization to have an employee/staff member/etc. work for an hour (or week, month, year, etc.) is determined not only by that person's hourly rate but also includes the cost of benefits, vacation time, facilities costs (office space, heating and cleaning, computers etc.), and the many other costs associated with having that person employed. Using known techniques, these (and any other suitable factors) are used to calculate the total (i.e., loaded) cost per developer.

Processing continues at block 306, where a cost per unit of processed code metric is determined based on the quantity of processed code and the cost determined, respectively, at blocks 302 and 304. In an embodiment, the cost per unit of processed code metric is calculated according to Equation 1:

$$\text{Cost Per Unit of Processed Code Metric} = \left[ \frac{Cost_T}{NCWLOC_T} \right] \quad \text{Eq. 1}$$

where the T subscript indicates that the value is determined on the basis of the time period in question.

Thereafter, at block 308, a quality scaling factor is calculated based on one or more quality measurements based on the code giving rise to the quantity of processed code. In an embodiment, the quality scaling factor is calculated according to Equation 2:

$$\text{Quality Scaling Factor} = \left[ \frac{N + M}{UTCQI_T + UTCQII_T} \right] \quad \text{Eq. 2}$$

where $UTCQI_T$ is the per developer unit tested code quality index, $UTCQII_T$ is the per developer improvement in UTCQI$_T$ as determined by improvement shown in the current time period compared to the previous time period and N and M are bounds on $UTCQI_T$ and $UTCQII_T$, respectively, i.e., $UTCQI_T \leq N$, $UTCQII_T \leq M$.

Figure 4:
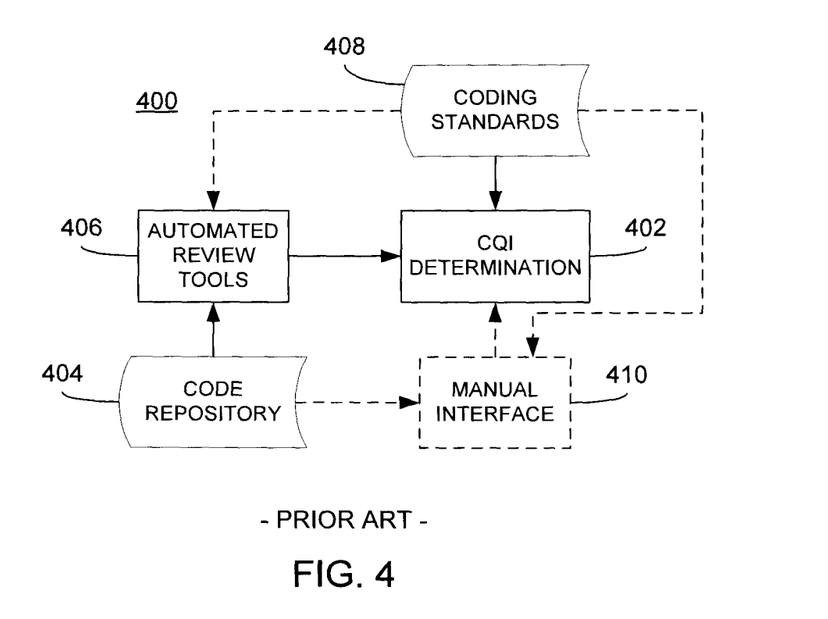
FIG. 4 is a block diagram of a prior art system that may be used in the determination of quality measurements in accordance with the instant disclosure.

In an embodiment, the per developer unit tested code quality index, $UTCQI_T$, combines measurements of code quality and unit test coverage, as expressed by Equation 3 below:

$$UTCQI_T = CQI_T \times TC_T/100 \qquad \text{Eq. 3}$$

where $CQI_T$ is the code quality index for the portion of the software code underlying the quantity of processed code during the time period and $TC_T$ is the unit test coverage percentage (expressed as $0 \leq TC_T \leq 100$) for the portion of the software code underlying the quantity of processed code during the time period. Currently existing tools, such as EMMA or Cobertura (in the case of "JAVA" language code) may be used to determine the unit test coverage percentage. The code quality index may be determined using a system of the type illustrated in FIG. 4.

FIG. 4 illustrates a system 400 described in Indian Patent Application No. 1987/MUM/2009 entitled "Assessment Of Software Code Quality Based On Coding Violation Indications", filed Sep. 1, 2009 and assigned to the same assignee as the instant application. In an embodiment, the system 400 may be used for the determination of a code quality index for a given portion of software code. In particular, the system 400 comprises a code quality index (CQI) determination component 402 and a code repository 404. The code repository, which may comprise, for example, one or more suitable storage server computers implementing suitable revision control or source code management (SCM) applications, stores the software code under consideration. The CQI determination component 402, which may be implemented using one or more suitable processing device (such as a laptop or server computer or the like) is operatively coupled to one or more automated review tools 406 that operate upon the code base stored in the code repository 404 and provide resulting coding violation indications to the CQI determination component 402. Various automated review tools 406 are known to those having ordinary skill in the art and include, by way of non-limiting example, Checkstyle, FindBugs and PMD analysis tools that are widely used in conjunction with software projects employing the "JAVA" programming language. As known in the art, such tools 406 may operate upon the basis of internally defined rules or constraints, but may also be used enforce externally developed standards as illustrated by the dotted line between the coding standards storage 408 and the automated review tools 406. Regardless, as used herein, a coding violation indication may comprise any output from the one or more automated review tools 406 signifying some manifestation of a deviation from accepted coding standards, which coding standards may include the internally defined standards of the tool(s) 406, industry-wide standards or standards particularly defined for a given software development project, e.g., by project management and/or client. The coding standards storage 408, which may comprise any suitable computer-compatible memory or storage device, includes those coding standards not internally stored by the automated review tools 406 and further includes a mapping to convert the various potential coding violation indications into a CQI score.

As further shown, the CQI determination component 402 may also interact with or comprise a manual interface 410 whereby coding violation indications based on manual reviews of the software code in the repository 404 can be employed. In an embodiment, the manual interface 410 may comprise suitable data entry fields in a graphical user interface or the like whereby a user of the system 400 can enter data concerning one or more manually-determined coding violation indications, provided such manual code review and violation indication entry limited to that code altered during the time period in question. Alternatively, the interface 410 may comprise a suitable machine interface, such as a serial or parallel data port, configured to receive any manually-determined data from another device (e.g., computer) not shown. Such manually-entered data may be incorporate into the determination of a code quality metric.

In an embodiment, the coding violations identified by the automated review tools 406 may be classified according to various priority levels, e.g., P1, P2 or P3 where P1 issues are of the highest priority and requiring immediate attention/correction, whereas P3 issues are of the lowest priority. In this embodiment, the CQI determination component 402 first converts the occurrences of various priority level issues into an incident measure in accordance with Equation $$\text{Incident Measure} = \left[ \frac{NCWLOC_T}{N_{P1} * 1.0 + N_{P2} * 0.8 + N_{P3} * 0.2} \right] \qquad \text{Eq. 4}$$

where $N_{P1}$, $N_{P2}$ and $N_{P3}$ are the number of P1, P2 and P3 coding violations, respectively, identified by the automated review tools 406. It is noted that, in this embodiment, the number of each priority level issues are weighted differently such that the higher priority issues are weighted more heavily. However, it may also be desirable to avoid the use of such weights or to employ different weights from those shown in Equation 4. Furthermore, a greater or less number of priority levels may be employed as a matter of design choice. Regardless, based on the Incident Measure thus determined, a mapping of the type illustrated in Table 1 below may be used to identify the CQI score:

TABLE 1

| Incident Measure | | CQI Score |
| From | To | |
| --- | --- | --- |
| 0 | 2 | 1 |
| 2 | 4 | 2 |
| 4 | 6 | 3 |
| 6 | 8 | 4 |
| 8 | 9 | 5 |
| 9 | 10 | 6 |
| 10 | 12 | 7 |
| 12 | 16 | 8 |
| 16 | 20 | 9 |
| 20 | | 10 |

The Incident Measure thus provides an indication of the frequency of coding violations relative to the amount of code in question. For example, if there are two or less NCWLOC for each weighted average coding violation, the resulting CQI score will be quite low, i.e., one. Alternatively, if the ratio of NCWLOC to each weighted average coding violation is relatively high, e.g., 20 or more, then a correspondingly high CQI is provided. Note that quality levels as indicated by the Incident Measure above a certain threshold are all mapped to the highest level CQI score, thereby bounding the upper level of quality measurement. Inspection of Equation 3 further reveals, then, that $UTCQI_T$ is upper bounded by the highest possible CQI score, i.e., N is equal to the maximum CQI score.

In a similar vein, the per developer unit tested code quality index, $UTCQII_T$, also combines measurements of code quality and unit test coverage in terms of improvement thereto. This is further illustrated by Equation 5 below:

$$UTCQII_T = \Delta CQI_T \times \Delta TC_T / 5 \qquad \text{Eq. 5}$$

where $\Delta CQI_T$ is the improvement in code quality index for the portion of the software code underlying the quantity of processed code between the current time period and the previous time period and $\Delta TC_T$ is the improvement in unit test coverage percentage (expressed as $0 \leq TC_T \leq 100$) for the portion of the software code underlying the quantity of processed code between the current and prior time periods. In this case, however, $\Delta TC_T$ is upper bounded by a 5% improvement limit, i.e., improvement percentage in $\Delta TC_T$ above 5% are nevertheless upper bounded to 5%. In an embodiment, the improvement in code quality index, $\Delta CQI_T$ is determined through a mapping of the type set forth in Table 2 below:

TABLE 2

| Incident Measure Improvement % | | CQI Improvement |
|---|---|---|
| From | To | Score |
| 1 | 4 | 1 |
| 4 | 8 | 4 |
| 8 | 12 | 6 |
| 12 | 14 | 8 |
| 15 | | 10 |

Note that quality levels as indicated by the Incident Measure improvement % above a certain threshold are all mapped to the highest level CQI improvement score, thereby bounding the upper level of quality measurement improvement. Inspection of Equation 5 further reveals, then, that $UTCQII_T$ is upper bounded by the highest possible CQI improvement score, i.e., M is equal to the maximum CQI improvement score.

Referring once again to FIG. 3, once the quality scaling factor has been calculated, processing continues at block 310 where the cost per unit of processed code is scaled by the quality scaling factor. Combining Equations 1 and 2, the determination of the CDI may be expressed as:

$$CDI = \left[\frac{Cost_T}{NCWLOC_T}\right] \times \left[\frac{N+M}{UTCQI_T + UTCQII_T}\right] \qquad \text{Eq. 6}$$

where $UTCQI_T$ and $UTCQII_T$ are determined as described above relative to Equations 3 and 5 and Tables 1 and 2.

In order to accommodate various scenarios that may arise in the calculation of CDI, various boundaries conditions can be handled as set forth in Table 3 below. For example, where no coding violations are detected in a non-trivial number of lines of code, then the Incident Measure is maximized while avoiding a divide by zero situation. Additionally, if no lines of code qualify for analysis during a given time period, then the Incident Measure is set to 0 and, more significantly, the CDI is also set to 0, once again to avoid a potential divide by zero situation. Alternatively, if the Incident Measure improvement percentage is negative, indicating that code quality has actually degraded in the time since the last analysis, then the CQI improvement score is set to a lower limit of 0. Finally, if the sum of the $UTCQI_T$ and $UTCQII_T$ is less than or equal to zero, then the CDI is set to equal to the cost for the time period.

TABLE 3

| Calculation component | Condition | Action |
|---|---|---|
| Incident Measure | $(N_{P1} * 1.0 + N_{P2} * 0.8 + N_{P3} * 0.2) = 0$ and NCWLOC != 0 | Incident Measure = 21 |
| Incident Measure | NCWLOC = 0 | Incident Measure = 0 |
| CQI Improvement Score | (Incident Measure improvement percentage) < 0 | CQI Improvement Score = 0 |
| CDI computation | NCWLOC = 0 | CDI = 0 |
| CDI computation | $(UTCQI_T + UTCQII_T) \leq 0$ | CDI = Cost |

Finally, at block 312, the CDI thus determined may be provided as output. For example, where the apparatus 200 is implemented via one or more computers comprising a display device, the CDI may be output as part of an spreadsheet displayed on a the display. Alternatively, the CDI may be provided in a printed form. Where multiple CDI determinations are made (e.g., across numerous individual developers and/or groups of developers), the various CDI determinations may be collected into a single report. Once again, various other techniques for providing CDIs as output will be readily evident to those having ordinary skill in the art and the instant disclosure is not limited in this regard.

Figure 5:
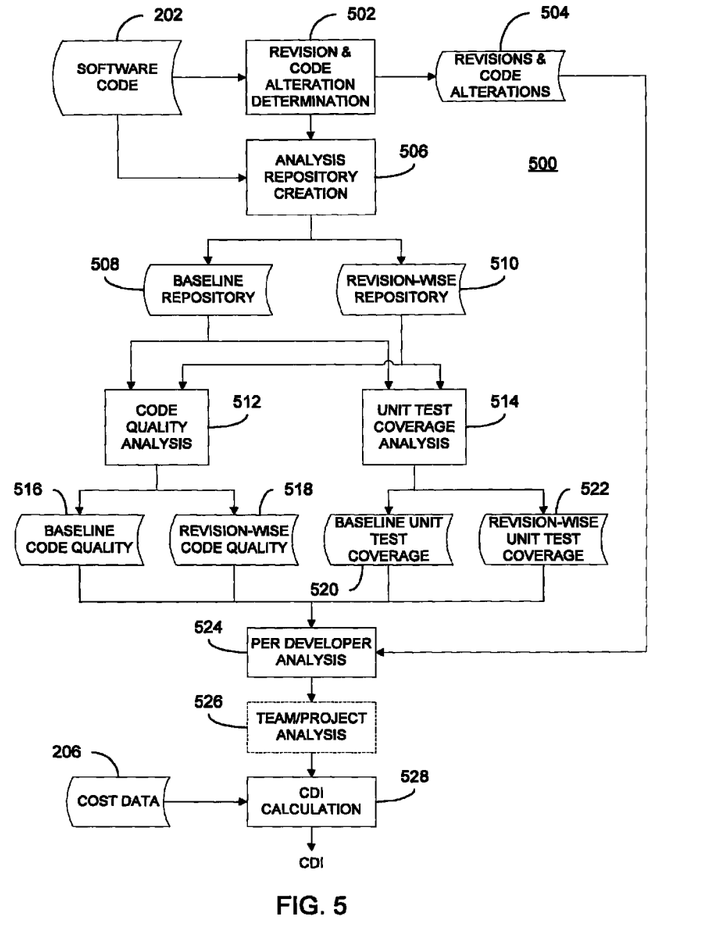
FIG. 5 is block diagram illustrating another embodiment in accordance with the instant disclosure.

Referring now to FIG. 5, another embodiment in accordance with the instant disclosure is described. More particularly, the embodiment illustrated in FIG. 5 illustrates a more detailed system 500 for implementing the techniques described herein. As shown, the system 500 comprises a revision and code alteration determination component 502 that operates upon the software code 202 to provide a revisions and code alterations repository 504. That is, the revision and code alteration determination component identifies, for a given period of time, which code in the software code 202 has been altered (i.e., has had lines of code created, modified and/or deleted) and also identifies specific revisions made to portions of code during the time period. For example, as noted above, the software code 202 may include information concerning what types of revisions are made and when they are made to specific code files. This revision information is provided by various code development tools as known in the art and are often provided in the form of log files. Thus, a revision log may be established, for the dates falling within the time period in question, for all code that has been altered. Inspection of these logs permits the establishment of the revisions and code alterations repository 504 in which information identifying the specific lines within code files that have been altered and the revision identification information for each such alteration.

As further shown, the system 500 comprises an analysis repository creation component 510 that operates to create repositories of code for subsequent quality analysis. In particular, the analysis creation component 510 creates both a baseline repository 508 and a revision-wise repository 510. The baseline repository 508 is created once during (preferably at the beginning of) a project and establishes a baseline of all code available to be analyzed at that point in time. Conversely, each time an analysis is performed subsequent to the establishment of the baseline repository 508, the revision-wise code repository 510 is updated to include only that portion of the code being analyzed, i.e., only that portion that has been modified during the time period in question. In this sense, the analysis repository creation component 506 operates to simply copy the relevant code files from the software code 202 as identified by the revision and alteration information provided by the revision and code alteration determination component 502.

As further shown in FIG. 5, a code quality analysis component 512 is provided that operates upon both the baseline repository 508 and the revision-wise repository 510 to respectively provide a baseline code quality log 516 and a revision-wise code quality log 518. As noted above, various tools are currently available for performing the desired code quality testing implemented by the code quality analysis component 512. In an embodiment, the code quality testing implemented by the code quality analysis component 512 is performed synchronously with the time period, e.g., at the end of each time period. In an alternative embodiment, code quality analysis can be continually performed and the results stored for subsequent use as alterations are made to files such that, when the relevant time period expires, most (if not all) of the relevant files will have been subjected to quality analysis already; any remaining files that have not be thus analyzed can be handled at the end of the time period. This may be desirable, for example, in cases where continuous integration (i.e., a process of integrating code every time a modified/new code file is committed to the source control repository). In this case, the code quality analysis component 512 can be run as part of the integration on only the modified/new code. In a similar vein, a unit test coverage analysis component 514 operates upon both the baseline repository 508 and the revision-wise repository 510 to respectively provide a baseline unit test coverage log 520 and a revision-wise unit test coverage log 522. As noted above, various tools are currently available for performing the desired unit test coverage determination implemented by the unit test coverage analysis component 514. Likewise, as further described above, performance of unit test coverage analysis can be synchronized to the time period or performed on a continuous basis.

Once the revision and code alterations repository 504 and all of the various logs 516-522 have been established/updated, a per developer analysis component 524 is employed to execute the various processed code quantity and quality determinations described above relative to FIG. 3 on a per developer basis. Likewise, where desired, a team/project analysis component 526 may optionally aggregate the various per developer determinations according to any desired grouping of individual developers. Thereafter, a CDI calculation component 528 operates upon the desired per developer and/or group-wise determinations and the cost data 206, again as described above relative to FIG. 3, to determine the individual and/or group cost of development indices.

Further explanation of the operation of the system 500 illustrated in FIG. 5 may be provided through an example illustrating how quality issues are handled on a per developer basis. Thus, in this example, the quality issues and unit test coverage for the entire code base are captured in the baseline code quality log 516 and baseline unit test coverage log 520.

Thereafter, for each execution of the code quality analysis component 512 and unit test coverage analysis component 514, code quality data and unit test coverage data is stored in the corresponding revision-wise code quality log 518 and revision-wise unit test coverage log 522. Thereafter, based on the information stored in the revision and code alterations repository 504, each distinct file checked in the repository during the current analysis period is identified. For each of these files, it is first determined whether the file has been modified or added during the period in question.

If a file has been modified (i.e., the file was an existing file in which a line of code was modified in some fashion), the all revisions to the file during the time period are determined and sorted in ascending order according to a revision number or similar indicator. For each revision of the file, it is determined if the revision is the smallest (i.e., earliest or least recent) revision in the sorted list of revisions. If a given revision is the smallest, then the number of coding violations, $N_{P1}$ through $N_{P3}$, as described above, are obtained for that revision of the file. Likewise, the coding violations for the last time the file was checked into the repository, denoted as $N'_{P1}$ through $N'_{P3}$ are also obtained without regard to the type of modification or the identification of the developer occurring at that time. In order to identify the last time a file was checked into the repository, the identification of the last analysis period that the file was in is determined and the latest revision for that file immediately prior to the identified analysis period is determined. Regardless of the manner in which they are obtained, the difference between the current and previous coding violations, i.e., $N_{Pi}-N'_{Pi}$ for $1 \leq i \leq 3$, are then determined and stored. Note that the differences in coding violations are attributed to developer that checked in the file and the revision under consideration. If a given revision is not the smallest, then the number of coding violations, $N_{P1}$ through $N_{P3}$, as described above, are obtained for that revision of the file. Additionally, the coding violations for the last revision of the file within the time period, denoted as $N''_{P1}$ through $N''_{P3}$, are also obtained. In this case, the difference between the current and previous coding violations, i.e., $N_{Pi}-N''_{Pi}$ for $1 \leq i \leq 3$, are then determined and stored, with the differences in coding violations attributed to the developer that checked in the file and the revision under consideration. After this process is repeated for all files that have been modified, the differences calculated as described above and attributable to a given developer are added together to provide an indication of the developer's coding quality improvement during the current time period.

If, on the other hand, a given file was added to the repository during the most recent period, then the number of coding violations, $N_{P1}$ through $N_{P3}$, as described above, are obtained for that file and attributed to the developer that checked in this file. After this process is repeated for all files that have been added, the number of coding violations determined in this manner and attributable to a given developer are added together to provide an indication of the developer's coding quality for new files during the current time period.

Upon completion of this process for all relevant files, all possible coding violations and coding violation improvements for those files have been attributed to respective ones of the developers. In order to assess the performance of a given developer, all coding violations (e.g., those determined for files added during the time period) and coding violation improvements (e.g., those determined for files modified during the time period) attributable to the given developer are added together. Note that the coding violation information determined at this point can be used to determine the Incident Measure (see Equation 4), and subsequently determine the CDI, as described above.

To illustrate this, Table 4 below illustrates two states of the quality measurements for two separate analysis periods, e.g., a current period (period 3) and a previous period (period 2), in which two distinct files, Test.java and Hello.java, are implicated.

TABLE 4

| Analysis period | className | added/modified | revision | Developer | $N_{P1}$ | $N_{P2}$ | $N_{P3}$ |
|---|---|---|---|---|---|---|---|
| 2 | Test.java | added | 1 | Dev-A | 10 | 10 | 10 |
| 2 | Test.java | modified | 2 | Dev-B | 20 | 20 | 20 |
| 3 | Test.java | modified | 3 | Dev-B | 30 | 30 | 30 |
| 3 | Test.java | modified | 4 | Dev-B | 40 | 40 | 40 |
| 3 | Hello.java | added | 5 | Dev-C | 50 | 50 | 50 |

Looking at the current period (period 3), for the file Test.java, the revisions are sorted in ascending order, i.e., 3, 4, as the file is categorized as having been modified. For revision 3 (i.e., the smallest or earliest), the number of coding violations, expressed as a triplet ($N_{P1}$, $N_{P2}$, $N_{P3}$), are (30, 30, 30). Furthermore, the coding violations for the last time the file was checked in (during the previous analysis period (period 2), where the largest (or latest) revision is revision 2) are (20, 20, 20). In this case, the difference between these two revisions are (30−20), (30−20), (30−20)=(10, 10, 10). These differences are then attributed to the developer that checked in revision 3 of Test.java, i.e., Dev-B. For revision 4 of Test.java, the current coding violations are (40, 40, 40), whereas the coding violations for the previous revision (revision 3) are, as noted previously, (30, 30, 30). Thus, the differences between these two revisions are (40−30), (40−30), (40−30)=(10, 10, 10). Once again, these differences are attributed to the developer that checked in revision 4 of Test.java, i.e., Dev-B.

For current period, the only other file is Hello.java, which was added during the current period. In this case, the coding violations for this file are (50, 50, 50) and are attributed to the developer that added this file, i.e., Dev-C. Note that, although a revision is indicated for Hello.java (revision 5), per the procedure described above, no differences need to be calculated and thus the revision indication is not considered.

With all revisions of all files thus considered, it only remains tally up the coding violations for each of the developers. In this case, Dev-B's coding violations are determined by differences computed above, i.e., (10+10), (10+10), (10+10)=(20, 20, 20). For Dev-C, the only coding violations are those resulting from the added file, i.e., (50, 50, 50). Based on these quality measurements, the CDI for each developer for the current period may be calculated as described above. Alternatively, or additionally, the individual quality measurements may be aggregated for the group consisting of Dev-B and Dev-C such that a group CDI may be calculated.

As described above, the instant disclosure sets forth various techniques for use in assessing the "effectiveness", in terms of quality and cost, of software development efforts. This is achieved by gathering information at the level of individual developers concerning the quantity of processed code attributable to a developer during a given time period, the cost attributable to the developer over that same time period as well as quality measurements for the software code underlying the quantity of processed code. Based on this information, a cost per unit of developed code metric is determined and subsequently scaled or discounted by a quality scaling factor to provide a cost of development index. Because the cost of development index may be calculated at the level of individual developers or groups of developers of varying sizes, comparisons between individual developers and groups of developers may be generated. Further still, such cost of development metrics may also be compared between projects.

The cost of development index also provides a balancing factor against typical process-centric metrics. For example, a process-centric metric that measures whether a project is delivering the product within estimated costs may show a high (good) value. However, if the CDI for that project is high, it indicates that although the project managed to deliver within cost estimates, its product quality is poor indicating that the cost of delivery is effectively higher than estimated. 1. Similarly there are other organizational metrics that observe whether a project manager has managed to form and retain a team consisting of a mix of people of different roles and seniority within an established team budget. In some instances, a project manager may be very successful in forming such a team within the established budget. However if that team's CDI is high, then it indicates that although the team formation budget is adhered to, the high cost of rework will negate all benefits of managing the team formation budget.

The cost of development index may also be used to identify opportunities to improve quality. For example, a given CDI value may be poor due to a low code quality index. In this case, the main concern is obviously poor code quality. In this case, it is recommended to identify the "hot-spots" in code quality and recommend code remediation to the project. To this end, it is noted that, as part of the data collected for the CDI computation, detailed code quality logs are stored in the database. These logs may be processed to generate hot spot reports that identify, for example, top code quality issues in project, top code quality issue categories in project, worst affected classes, etc. With these reports, the project can quickly drill down into the hot spots and assign team members to resolve the issues and improve CDI.

In another case, a given CDI value may be poor due to a low unit tested code quality index. Assuming that code quality index is good, a low unit tested code quality index indicates poor unit test coverage of the code, which in turn implies that the project is not adequately investing effort in writing high quality unit tests. In this case, the recommendation to the project is to identify parts of code that have poor coverage. Such a report is derivable from the database table holding unit test coverage data for the various portions (e.g., classes) code. To permit effective action, the list of code portions having poor coverage can be further filtered based on the complexity of the portion, where complexity is defined as HIGH, MEDIUM, SIMPLE according to cyclomatic complexity of the various portions of code. With this classification, the project can prioritize effort across the complexity categories to improve unit test coverage.

In yet another example, a given CDI value may be poor due to low throughput. Low throughput indicates not much work has happened in a period. Stated another way, this indicates that, although investments were made in the team, work output is low. In this case, it becomes necessary for project management to evaluate whether the higher team costs are justified. Furthermore, if there are multiple projects for a given delivery team or unit, it may be desirable for the delivery unit leader to reallocate some number of resources to other projects for balancing costs and improving the cost efficiencies of individual projects as well as the overall delivery unit.

Further still, a given CDI value may be poor due to high loaded costs. In this case, it may be desirable to balance the relatively poor CDI value against traditional metrics such as the well-known Cost Performance Index (CPI), i.e., the budgeted cost of work performed divided by the actual cost of the work performed. For example, if the CDI is poor because of high loaded costs but CPI is good (i.e., close to 1, indicating that the development team is operating within budget/estimates), then factors beyond performance of the team should be evaluated. Of course, this wouldn't necessarily foreclose closer inspection of the other factors influencing the CDI, e.g., code quality, test coverage, etc., where restructuring of the team may still be an option to improve the CDI value.

Further still, the cost of development index may be used to help estimate amounts of work or to establish service level agreement benchmarks prior to starting software development projects. For example, if an estimated KLOC (thousands of lines of code) number is being used to estimate the work to be performed on a given project, then a cost estimate to generate the desired code can be based on the cost of development index determined for similar projects. Alternatively, the cost of development index could be used to create pricing models whereby a client is charged by the number of lines of code meeting a designated CDI level. For at least these reasons, the above-described techniques represent an advancement over prior art teachings.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for assessing software code development, the method comprising:
   calculating, by a processing device, a first cost per unit of processed code metric using a first quantity of processed code during a time period attributable to a first developer of a plurality of developers and a first cost to develop the quantity of code during the time period attributable to the first developer;
   calculating, by the processing device, a first quality scaling factor using first quality measurements for the first quantity of processed code, wherein the first quality measurements include, for the first quantity of processed code, at least one of a code quality index weighted by a test coverage percentage for a portion of code underlying the first quantity of processed code during the time period and a code quality index improvement weighted by a test coverage percentage improvement for a portion of code underlying the first quantity of the processed code between a current time and prior time periods; and
   scaling, by the processing device, the first cost per unit of processed code metric by the first quality scaling factor to provide a first individual cost of development index for the first developer.

2. The method of claim 1, further comprising:
   determining, by the processing device, the first quantity of processed code during the time period using a portion of software code that has been altered during the time period by the first developer.

3. The method of claim 2, wherein the portion of the software code comprises a number of non-commented, non-white space lines of code that have been altered during the time period.

4. The method of claim 1, further comprising:
   determining, by the processing device, the first cost by calculating a loaded cost attributable to the first developer during the time period, wherein the loaded cost attributable to the first developer includes benefits, vacation time, facilities costs, and administrative overhead.

5. The method of claim 1, further comprising:
   determining, by the processing device, additional quantities of processed code during the time period and attributable to corresponding ones of the plurality of developers other than the first developer;
   determining, by the processing device, additional costs to develop corresponding ones of the additional quantities of processed code during the time period and attributable to the corresponding one of the plurality of developers other than the first developer;
   aggregating, by the processing device, the first quantity of processed code and the additional quantities of processed code to provide a group quantity of processed code;
   aggregating, by the processing device, the first cost and the additional costs to provide a group cost; and
   calculating, by the processing device, a group cost per unit of processed code metric using the group quantity of processed code and the group cost.

6. The method of claim 5, further comprising:
   determining, by the processing device, additional quality measurements for corresponding ones of the additional quantities of processed code during the time period and attributable to the corresponding one of the plurality of developers other than the first developer;
   aggregating, by the processing device, the first quality measurements and the additional quality measurements to provide group quality measurements;
   calculating, by the processing device, a group quality scaling factor using the group quality measurements; and
   scaling, by the processing device, the group cost per unit of processed code metric by the group quality scaling factor to provide a group cost of development index for the plurality of developers.

7. The method of claim 6, further comprising:
   outputting, by the processing device, the group cost of development index.

8. The method of claim 1, further comprising: outputting, by the processing device, the first individual cost of development index.

9. An apparatus for assessing software code development comprising:
   at least one processor; and
   at least one storage device having stored thereon instructions that, when executed, cause the at least one processing device to:
   calculate a first cost per unit of processed code metric using a first quantity of processed code during a time period attributable to a first developer of a plurality of developers and a first cost to develop the quantity of code during the time period attributable to the first developer;
   calculate a first quality scaling factor using first quality measurements for the first quantity of processed code, wherein the first quality measurements include, for the first quantity of processed code, at least one of a code quality index weighted by a test coverage percentage for a portion of code underlying the first quantity of processed code during the time period and a code quality index improvement weighted by a test coverage percentage improvement for a portion of code underlying the first quantity of the processed code between a current time and prior time periods; and
   scale the first cost per unit of processed code metric by the first quality scaling factor to provide a first individual cost of development index for the first developer.

10. The apparatus of claim 9, the at least one storage device further comprising instructions that, when executed, cause the at least one processing device to:
    determine the first quantity of processed code during the time period using a portion of software code that has been altered during the time period by the first developer.

11. The apparatus of claim 10, wherein the portion of the software code comprises a number of non-commented, non-white space lines of code that have been altered during the time period.

12. The apparatus of claim 9, the at least one storage device further comprising instructions that, when executed, cause the at least one processing device to:
    determine the first cost by calculating a loaded cost attributable to the first developer during the time period, wherein the loaded cost attributable to the first developer includes benefits, vacation time, facilities costs, and administrative overhead.

13. The apparatus of claim 9, the at least one storage device further comprising instructions that, when executed, cause the at least one processing device to:
  determine additional quantities of processed code during the time period and attributable to corresponding ones of the plurality of developers other than the first developer;
  determine additional costs to develop corresponding ones of the additional quantities of processed code during the time period and attributable to the corresponding one of the plurality of developers other than the first developer;
  aggregate the first quantity of processed code and the additional quantities of processed code to provide a group quantity of processed code;
  aggregate the first cost and the additional costs to provide a group cost; and
  calculate a group cost per unit of processed code metric using the group quantity of processed code and the group cost.

14. The apparatus of claim 13, the at least one storage device further comprising instructions that, when executed, cause the at least one processing device to:
  determine additional quality measurements for corresponding ones of the additional quantities of processed code during the time period and attributable to the corresponding one of the plurality of developers other than the first developer;
  aggregate the first quality measurements and the additional quality measurements to provide group quality measurements;
  calculate a group quality scaling factor using the group quality measurements; and
  scale the group cost per unit of processed code metric by the group quality scaling factor to provide a group cost of development index for the plurality of developers.

15. The apparatus of claim 14, the at least one storage device further comprising instructions that, when executed, cause the at least one processing device to:
  output the group cost of development index.

16. The apparatus of claim 9, the at least one storage device further comprising instructions that, when executed, cause the at least one processing device to: output the first individual cost of development index.

17. A method for assessing software code development, the method comprising:
  determining, by a processing device, a portion of software code that has been altered during a time period to provide a quantity of processed code;
  performing, by the processing device, code quality analysis of the quantity of processed code to provide quality measurements;
  performing, by the processing device, unit test coverage analysis of the quantity of processed code to provide a test coverage percentage;
  calculating, by the processing device, a quality scaling factor using the quality measurements and the test coverage percentage, wherein the quality measurements include at least one of a code quality index weighted by the test coverage percentage for a portion of code underlying the quantity of the processed code during the time period and a code quality index improvement weighted by a test coverage percentage improvement for a portion of the code underlying the quantity of the processed code between a current time and prior time periods;
  calculating, by the processing device, a cost per unit of processed code metric using the quantity of processed code and a cost to develop the quantity of code during the time period; and
  calculating, by the processing device, a cost of development index using the cost per unit of processed code metric and the quality scaling factor.

18. The method of claim 17, further comprising: outputting, by the processing device, the cost of development index.

19. The method of claim 17, wherein determining the quantity of processed code and calculating the cost per unit of processed code metric are performed on the basis of first developer of a plurality of developers.

20. The method of claim 19, further comprising:
  determining, by the processing device, another portion of software code that has been altered during the time period to provide an additional quantity of processed code, wherein the other portion of code is attributable to developers of the plurality of developers other than the first developer;
  performing, by the processing device, code quality analysis of the additional quantity of processed code to provide additional quality measurements;
  performing, by the processing device, unit test coverage analysis of the additional quantity of processed code to provide an additional test coverage percentage;
  determining, by the processing device, additional cost to develop the additional quantity of processed code;
  aggregating, by the processing device, the quantity of processed code and the additional quantity of processed code to provide a group quantity of processed code;
  aggregating, by the processing device, the cost and the additional cost to provide a group cost;
  aggregating, by the processing device, the quality measurements and the additional quality measurements to provide group quality measurements;
  aggregating, by the processing device, the test coverage percentage and the additional test coverage percentage to provide a group test coverage percentage;
  calculating, by the processing device, a group cost per unit of processed code metric using the group quantity of processed code and the group cost;
  calculating, by the processing device, a group quality scaling factor using the group quality measurements and the group test coverage percentage; and
  calculating, by the processing device, a group cost of development index using the group cost per unit of processed code metric and the group quality scaling factor.

21. An apparatus for assessing software code development comprising:
  at least one processor; and
  at least one storage device having stored thereon instructions that, when executed, cause the at least one processing device to:
  determine a portion of software code that has been altered during a time period to provide a quantity of processed code;
  perform code quality analysis of the quantity of processed code to provide quality measurements;
  perform unit test coverage analysis of the quantity of processed code to provide a test coverage percentage;
  calculate a quality scaling factor using the quality measurements and the test coverage percentage, wherein the quality measurements include at least one of a code quality index weighted by the test coverage percentage for a portion of code underlying the quantity of the processed code during the time period and a code quality index improvement weighted by a test coverage percentage improvement for a portion of the code underlying the quantity of the processed code between a current time and prior time periods;

calculate a cost per unit of processed code metric using the quantity of processed code and a cost to develop the quantity of code during the time period; and calculate a cost of development index using the cost per unit of processed code metric and the quality scaling factor.

22. The apparatus of claim 21, the at least one storage device further comprising instructions that, when executed, cause the at least one processing device to:

output the cost of development index.

23. The apparatus of claim 21, wherein those instructions that, when executed, cause the at least one processor to determine the quantity of processed code and calculate the cost per unit of processed code metric are further operative to be performed on the basis of first developer of a plurality of developers.

24. The apparatus of claim 21, the at least one storage device further comprising instructions that, when executed, cause the at least one processing device to:

determine another portion of software code that has been altered during the time period to provide an additional quantity of processed code, wherein the other portion of code is attributable to developers of the plurality of developers other than the first developer;

perform code quality analysis of the additional quantity of processed code to provide additional quality measurements;

perform unit test coverage analysis of the additional quantity of processed code to provide an additional test coverage percentage;

determine additional cost to develop the additional quantity of processed code;

aggregate the quantity of processed code and the additional quantity of processed code to provide a group quantity of processed code;

aggregate the cost and the additional cost to provide a group cost;

aggregate the quality measurements and the additional quality measurements to provide group quality measurements;

aggregate the test coverage percentage and the additional test coverage percentage to provide a group test coverage percentage;

calculate a group cost per unit of processed code metric using the group quantity of processed code and the group cost;

calculate a group quality scaling factor using the group quality measurements and the group test coverage percentage; and calculate a group cost of development index using the group cost per unit of processed code metric and the group quality scaling factor.

* * * * *

UNITED STATES PATENT AND TRADEMARK OFFICE
CERTIFICATE OF CORRECTION

| | | |
|---|---|---|
| PATENT NO. | : 8,776,007 B2 | Page 1 of 1 |
| APPLICATION NO. | : 13/101315 | |
| DATED | : July 8, 2014 | |
| INVENTOR(S) | : Pramod Bijani et al. | |

It is certified that error appears in the above-identified patent and that said Letters Patent is hereby corrected as shown below:

ON THE TITLE PAGE:

Immediately under "(22) Filed May 5, 2011" add:

(30) Foreign Application Priority Data

Jul. 5, 2010    (IN) ................................. 1290/CHE/2010

Signed and Sealed this
Seventh Day of October, 2014

Michelle K. Lee
*Deputy Director of the United States Patent and Trademark Office*